(12) United States Patent
Oku et al.

(10) Patent No.: US 10,142,601 B2
(45) Date of Patent: Nov. 27, 2018

(54) INFORMATION PRESENTATION DEVICE

(71) Applicant: The University of Tokyo, Tokyo (JP)

(72) Inventors: Hiromasa Oku, Tokyo (JP); Alvaro Cassinelli, Tokyo (JP); Masahiko Yasui, Tokyo (JP); Masatoshi Ishikawa, Tokyo (JP)

(73) Assignee: The University of Tokyo, Tokyo (JP)

( * ) Notice: Subject to any disclaimer, the term of this patent is extended or adjusted under 35 U.S.C. 154(b) by 74 days.

(21) Appl. No.: 14/902,828

(22) PCT Filed: Jun. 25, 2014

(86) PCT No.: PCT/JP2014/066779
§ 371 (c)(1),
(2) Date: Jan. 4, 2016

(87) PCT Pub. No.: WO2015/002040
PCT Pub. Date: Jan. 8, 2015

(65) Prior Publication Data
US 2016/0191871 A1   Jun. 30, 2016

(30) Foreign Application Priority Data
Jul. 5, 2013  (JP) ................................ 2013-141939

(51) Int. Cl.
*H04N 9/31* (2006.01)
*H04N 5/225* (2006.01)
(Continued)

(52) U.S. Cl.
CPC ......... *H04N 9/3132* (2013.01); *G02B 26/101* (2013.01); *G02B 27/144* (2013.01);
(Continued)

(58) Field of Classification Search
CPC ...... H04N 9/3132; H04N 5/2256; H04N 5/74; H04N 9/3129; G02B 27/144; G02B 26/10; G09G 3/02; G09G 3/025
(Continued)

(56) References Cited

U.S. PATENT DOCUMENTS

| 5,086,341 A * | 2/1992 | Tamada ............... G02F 1/33 348/198 |
| 5,130,838 A | 7/1992 | Tanaka et al. |

(Continued)

FOREIGN PATENT DOCUMENTS

| JP | 4-18613 A | 1/1992 |
| JP | 4-51011 A | 2/1992 |

(Continued)

OTHER PUBLICATIONS

Okumura, K. et al., "Lumipen: Projection-Based Mixed Reality for Dynamic Objects," 2012 IEEE International Conference on Multimedia and Expo, pp. 699-704.
(Continued)

*Primary Examiner* — Hee-Yong Kim
(74) *Attorney, Agent, or Firm* — Seed Intellectual Property Law Group LLP

(57) ABSTRACT

An object of the present invention is to provide a device that is capable of presenting image information that is larger than an object by irradiating light onto the object that moves on a trajectory that is not known. An object tracking section controls line of sight direction so as to be directed towards a moving object. A rendering section irradiates a light beam in a direction along the line of sight direction. In this way the rendering section can irradiate the light beam onto the surface of the object. It is possible to present information, that has been rendered in a range that is larger than the surface area of the object, to an observer, utilizing an after (Continued)

image of the light beam that has been irradiated on the surface of the object.

5 Claims, 4 Drawing Sheets

(51) Int. Cl.
    *G02B 27/14*     (2006.01)
    *H04N 9/47*     (2006.01)
    *G06K 7/10*     (2006.01)
    *G09G 3/02*     (2006.01)
    *H04N 5/74*     (2006.01)
    *G02B 26/10*     (2006.01)

(52) U.S. Cl.
    CPC .............. *G09G 3/02* (2013.01); *G09G 3/025* (2013.01); *H04N 5/2256* (2013.01); *H04N 5/74* (2013.01); *H04N 9/3129* (2013.01)

(58) Field of Classification Search
    USPC .......................................................... 348/170
    See application file for complete search history.

(56) References Cited

U.S. PATENT DOCUMENTS

| | | | | |
|---|---|---|---|---|
| 5,317,348 | A * | 5/1994 | Knize | G02F 1/3532 |
| | | | | 348/750 |
| 8,711,216 | B2 * | 4/2014 | Chien | H04N 5/2354 |
| | | | | 348/142 |
| 2002/0080236 | A1 * | 6/2002 | Madsen | G02B 7/32 |
| | | | | 348/131 |
| 2002/0195496 | A1 * | 12/2002 | Tsikos | B82Y 15/00 |
| | | | | 235/462.01 |
| 2005/0168728 | A1 | 8/2005 | Stern et al. | |
| 2012/0033855 | A1 | 2/2012 | Ryan | |

FOREIGN PATENT DOCUMENTS

| | | |
|---|---|---|
| JP | 5-341411 A | 12/1993 |
| JP | 2005-118226 A | 5/2005 |
| JP | 2012-137681 A | 7/2012 |

OTHER PUBLICATIONS

Extended European Search Report for EP 14820274.0, dated Jan. 13, 2017, 10 pgs.
Okumura et al., "High-speed Gaze Controller for Millisecond-order Pan/tilt Camera," 2011 IEEE International Conference on Robotics and Automation, Shanghai International Conference Center, May 9-13, 2011, Shanghai, China, 6 pages.
International Search Report and Written Opinion, dated Sep. 30, 2014, for International Application No. PCT/JP2014/066779, 11 pages (with English Translation).
Okumura et al., "Projection-based AR for Dynamic Objects by Using High-speed Optical Axis Control," *The Journal of the Institute of Image Information and Television Engineers* 67(7):J204-J211, 2013 (with English Abstract).
Kohei Okumura et al., "Projection-based AR for Dynamic Objects by Using High-speed Optical Axis Control", Eizo Joho Media Gakkaishi—The Journal of the Institute of Image Information and Television Engineers, vol. 67, No. 7, Jan. 1, 2013 (Jan. 1, 2013), pp. J204-J211, XP055310229, JP ISSN: 1342-6907, DOI: 10.3169/itej. 67.J204.
Kohei Okumura, Hiromasa Oku and Masatoshi Ishikawa, "Projection-based AR for Dynamic.Objects by Using High-speed Optical Axis Control", Paper Feature Articles Video Recognition— Understanding Technology and Application Thereof [English translation of NPL1].
Anonymous, "The Journal of the Institute of Image Information and Television Engineers", May 14, 2018 (May 14, 2018), XP055474858, Retrieved from the Internet: URL:https://www.jstage.jst.go.jp/browse/ itej/67/7/_contents/-char/en [retrieved on May 14, 2018].
EPO Communication dated Jun. 4, 2018 by the European Patent Office in EP Application No. EP14820274.0.

* cited by examiner

INFORMATION PRESENTATION DEVICE

TECHNICAL FIELD

The present invention relates to technology for presenting graphical information within a space.

BACKGROUND ART

Technology for presenting graphical information to an observer by irradiating laser light onto a screen or ceiling is described in patent publications 1 and 2 below. With this technology it is possible to render an arbitrary graphic (for example a symbol or letter) by scanning laser light using galvano mirrors having two axes.

However, with these technologies there is a problem in that it is difficult to render a large graphic that is larger than the size of the physical object that is being irradiated (for example, a screen).

On the other hand, so-called versa-writer technology is known (refer to patent publication 3 below). This technology presents graphical information to an observer using an after-image effect, by moving a light beam at high speed in a given direction.

However, with a versa-writer a light source itself passes along a given path. This means that if power feed to the light source is considered, there is a considerable restriction in the path the light source follows, and as a result there is a restriction in the depiction that can be carried out with a versa-writer. Also, with a versa-writer, it is theoretically difficult to carry out depiction on an arbitrary object without a light source.

CITATION LIST

Patent Literature

[Patent Publication 1]
Japanese Patent laid-open No. Hei. 4-51011
[Patent Publication 2]
Japanese Patent laid-open No. 2005-118226
[Patent Publication 3]
Japanese Patent laid-open No. 2012-137681

Non-Patent Literature

[Non-patent Publication 1]
K. Okumura, H. Oku and M. Ishikawa: "High-Speed Gaze Controller for Millisecond-order Pan/tilt Camera", Proc. of IEEE Int'l Conf. on Robotics and Automation, pp. 6186. 6191 (2011).

SUMMARY OF THE INVENTION

Technical Problem

The present invention has been conceived in view of the above-described situation. A main object of the present invention is to provide a device that is capable of displaying an image that is larger than an object by irradiating light onto the object that moves on a trajectory that is not known.

Solution To Problem

Means for solving the above-described problems can be described as in the following aspects.

(Aspect 1)

An information presentation device, comprising an object tracking section and a rendering section, wherein
the object tracking section controls line of sight direction so as to be directed towards the moving object,
the rendering section irradiates a light beam to a surface of the object by emitting the light beam in a direction along the line of sight direction, and
information that has been rendered in a range that is larger than the surface area of the object is presented using an after image of the light beam that has been irradiated to the surface of the object.

(Aspect 2)

The information presentation device of aspect 1, wherein the object tracking section comprises an image sensor, a processing section and a line of sight direction control section,
the image sensor acquires an image of the object,
the processing section acquires position of the object based on the image of the object, and
the line of sight direction control section controls line of sight direction from the image sensor to the object so as to be directed towards the position of the object.

(Aspect 3)

The information presentation device of aspect 1 or aspect 2, wherein the rendering section is provided with a light source and a scanning section,
the light source emits the light beam, and
the scanning section controls irradiation position of the light beam to the object by changing direction of the light beam.

(Aspect 4)

The information presentation device of aspect 3, wherein the scanning section carries out the scanning so that presentation of required information is completed in a range of viewing angle of 0° to 3° with a viewpoint of the observer as center, in accordance with movement speed of the object.

(Aspect 5)

The information presentation device of aspect 3 or aspect 4, wherein the light source is a laser light source.

(Aspect 6)

The information presentation device of any one of aspects 3 to 5, wherein the light source can independently emit light of at least two colors among red, green and blue.

(Aspect 7)

The information presentation device of any one of aspects 1-6, further comprising a half mirror, and wherein
the half mirror is inserted at some point along the line of sight from the object tracking section to the object, and
the light beam is conveyed in a direction that is coaxial with the line of sight by the half mirror.

(Aspect 8)

An information presentation method comprising the following steps:
(a) a step of controlling line of sight direction so as to be directed towards a moving object;
(b) a step of irradiating a light beam onto a surface of the object by emitting the light beam in a direction along the line of sight direction, and
(c) a step of presenting information that has been rendered in a range that is larger than the surface area of the object to an observer using an after image of the light beam that has been irradiated to the surface of the object.

A computer program for executing this method can be stored in a suitable storage medium (for example, an optical storage medium such as CD-ROM or DVD disc, electromagnetic storage medium such as a hard disk or flexible disk, or a magnetooptical storage medium such as MO disk).

This computer program can also be transmitted by means of a communication network such as the Internet.

Advantageous Effect of the Invention

According to the present invention, it is possible to display a large image that is larger than a moving object by irradiating a light beam onto the object, while tracking the moving object using an object tracking section.

DESCRIPTION OF THE EMBODIMENTS

An information presentation device of one embodiment of the present invention will be described in the following with reference to the attached drawings.

Structure of the this Embodiment

Figure 1:
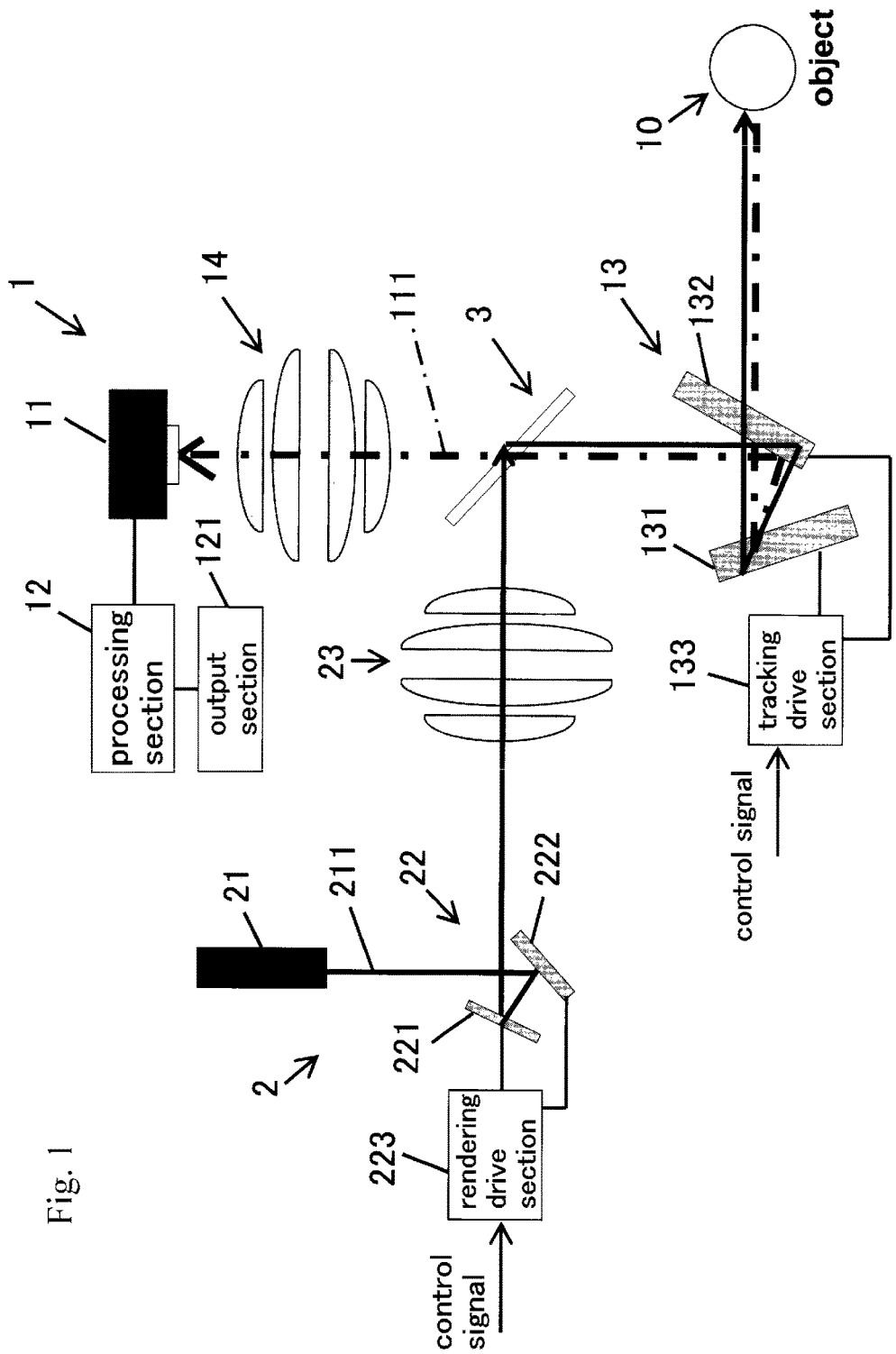
FIG. 1 is an explanatory drawing showing the schematic structure of an information presentation device of one embodiment of the present invention.

The information presentation device of this embodiment comprises an object tracking section 1, a rendering section 2 and a half mirror 3 (refer to FIG. 1).

The object tracking section 1 controls line of sight direction so as to be directed towards a moving object 10 (refer to FIG. 1). More specifically, the object tracking section 1 of this embodiment comprises an image sensor 11, a processing section 12 and a line of sight direction control section 13. This object tracking section 1 is further provided with a pupil shift optical system 14 for the image sensor. In FIG. 1, line of sight 111 is shown by a dot and dash line.

The image sensor 11 acquires an image of the object 10 using a light beam that is incident from the object 10 via the line of sight direction control section 13, the half mirror 3 and the pupil shift optical system 14.

The processing section 12 acquires position of the object using the image of the object that has been acquired by the image sensor 11. The processing section 12 can be implemented by a combination of a personal computer and a computer program, for example. However, the function of the processing section 12 may be performed by means of a network using cloud computing, for example. The processing section 12 is provided with an output section 121. The output section 121 of this embodiment outputs control signals to the line of sight direction control section 13 so as to direct line of sight direction towards the position of the object 10 that has been acquired by the processing section 12.

The line of sight direction control section 13 controls line of sight direction from the image sensor 11 to the object 10 so as to be directed towards the position of the object 10. More specifically, the line of sight direction control section 13 of this embodiment controls line of sight direction using two galvano mirrors 131 and 132. Each of the galvano mirrors 131 and 132 is capable of being turned in forward and reverse directions about rotation axes that extend perpendicular to each other, by a drive section 133 for tracking.

Perpendicular here is not necessarily actually crossing, as long as a scalar product of direction vectors along each of the axes is 0. Also, perpendicular here does not have the mathematically precise meaning, and a certain error is permitted as long as it is possible to exhibit the desired function. Control signals from the output section 121 are input to the drive section 133.

The pupil shift optical system 14 shifts pupil position of the image sensor 11 to the vicinity of the galvano mirrors 131 and 132, for example, between the two.

The remaining structure of the previously described object tracking section 1 is basically the same as the technology disclosed in non-patent publication 1 above by the present inventors, and so more detailed description of the object tracking section 1 is omitted.

The rendering section 2 irradiates a light beam on a surface of the object 10 by emitting a light beam in a direction along a line of sight direction from the image sensor 11 to the object 10. More specifically, the rendering section 2 of this embodiment comprises a light source 21, scanning section 22 and pupil shift optical system 23.

The light source 21 emits a light beam 211 (shown by the solid line in FIG. 1). A laser light source may be used as the light source 21 of this embodiment. The timing at which the light source 21 is emitted is controlled in this embodiment by the processing section 12.

The scanning section 22 controls irradiation position of the light beam 211 on the object 10 by changing direction of the light beam 211. As a result, with this embodiment, information that has been rendered in a range that is larger than the surface area of the object 10 is presented using an after image of the light beam that has been irradiated to the surface of the object 10.

More specifically, the scanning section 22 of this embodiment is provided with two scanning galvano mirrors 221 and 222, and a rendering drive section 223. Similarly to the previously described galvano mirrors 131 and 132 for line of sight direction control, the galvano mirrors 221 and 222 are capably of being independently turned by the rendering drive section 223 about two axes that extend in directions that are perpendicular to each other. The drive section 223 is configured to receive control signals that have been generated by the processing section 12 by means of the output section 121. The scanning section 22 of this embodiment carries out scanning so that presentation of required information is completed in a range of viewing angle of 0° to 3° with a main viewpoint of the observer as center, in accordance with movement speed of the object 10, based on control commands from the processing section 12.

The basic structure of the scanning section 22 may be made basically the same as the line of sight direction control device described in non-patent publication 1 described previously, and so a more detailed description is omitted.

The pupil shift optical system 23 shifts pupil position of the light source 21 to the vicinity of the line of sight direction control section 13, or in more detail, to "the vicinity of the pupil position of the image sensor 11 that has been shifted by the pupil shift optical system 14". However, in a case where a laser light source is used as the light source 21, since a thin light beam is maintained it can be considered that there would generally be no problem in omitting installation of the pupil shift optical system 23.

The half mirror 3 in inserted in the line of sight 111 from the object tracking section 1 to the object 10. The light beam 211 is sent in a direction coaxial with the line of sight 111 by the half mirror 3, and is irradiated to the object 10 (refer to FIG. 1).

Operation of this Embodiment

Next, an information presentation method using the information presentation device of this embodiment described previously will be described with further reference to the flowchart shown in FIG. 2.

Figure 2:
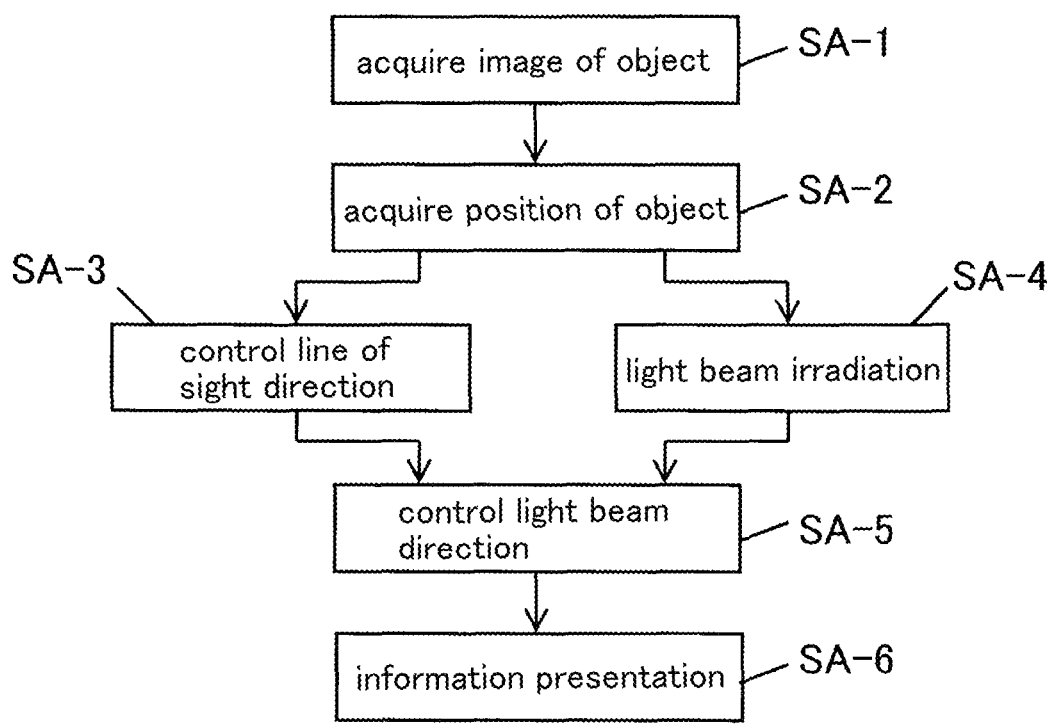
FIG. 2 is a flowchart for describing operation of the device of FIG. 1.

(Step SA-1 in FIG. 2)

First, an image of the object 10, on which line of sight 111 is trained, is acquired by the image sensor 11 of the object tracking section 1. Here, an image of the object passes through the line of sight direction control section 13, half mirror 3, and pupil shift optical system 14, and is input to the image sensor 11.

(Step SA-2 in FIG. 2)

Next, the processing section 12 acquires position of the object 10 based on a difference between an image at a given time t and an image at t+Δt (or t−Δt). A two-dimensional position of the object in a world coordinate system is acquired by the processing section 12 by ascertaining correspondence between position of the object 10 in a world coordinate system (fixed coordinate system) and pixel position. For use in tracking an object based on an image, it is normally sufficient if a two-dimensional position of the object is ascertained. An existing method by the present inventors (for example, the previously described non-patent publication 1) may be used as a method for this type of position acquisition based on image difference, and so detailed description is omitted. If object position is continuously calculated with the previously described Δt made small, it is possible to track an object moving at high speed.

(Step SA-3 in FIG. 2)

Next, the processing section 12 drives the galvano mirrors 131 and 132 using the tracking drive section 133, by sending control signals to the line of sight direction control section 13. In this way, it is possible to control direction of line of sight 111 using the line of sight direction control section 13 so as to be directed towards a moving object 10. This means that it is possible to have line of sight continuously directed towards the object 10 by repeatedly controlling line of sight direction in accordance with object position that has been acquired. With this embodiment it becomes possible to change line of sight direction at high speed by using the galvano mirrors 131 and 132 having two axes in the line of sight direction control section 13.

(Step SA-4 in FIG. 2)

On the other hand, the light beam 211 is emitted from the light source 21 of the rendering section 2. An emitted light beam is sent by the half mirror 3 in a direction that is coaxial with the line of sight 111, after passing through the scanning section 22 and the pupil shift optical system 23. Here, direction of the line of sight 111 is directed in the direction towards the object 10, and so according to this embodiment it is possible to effectively irradiate the light beam 211 to the surface of the object 10.

Normally, in order to irradiate a light beam on an object that is moving on an unknown trajectory within a three-dimensional space, it is necessary to know not only a two-dimensional position, but also a position in a depth direction. Conversely, since, with the rendering section 2 of this embodiment, the light beam 211 is emitted in a direction that is coaxial with the line of sight of the object tracking section 1, there is the advantage that it is possible to effectively irradiate a light beam on an object without obtaining information on the depth of the object position.

Regarding timing of irradiation, irradiation of the light beam may also be carried out continuously from before previously described step SA-1. Basically, the light source 21 may be driven so as to irradiate the light beam to the object 10 for a required time.

(Step SA-5 in FIG. 2)

The rendering drive section 223 of the rendering section 2 drives the scanning section 22 in accordance with control signals from the processing section 12. In this way it is possible to change direction of the light beam 211 irradiated to the object 10. Here, change in light beam direction by the scanning section 22 is preferably in a range in which the light beam does not deviate from the object 10.

(Step SA-6 in FIG. 2)

In this embodiment, it is possible to carry out graphical display (which may be letters or symbols) on an object surface by changing light beam direction using the scanning section 22. With the example shown in FIG. 3, the object 10 is moving to the right in the drawing. By irradiating the light beam 211 to the surface of the object, with this embodiment it is possible to carry out display of "VR" (section enclosed by the two-dot chain line in FIG. 3) utilizing scanning of the light beam. This display is unicursal because of the laser light (that is, display of only a single point at a given instant), but an observer can perceive this display because of the after image effect. That is, with this embodiment it is possible to present information that has been rendered in a range that is larger than the surface area (projected area) of the object 10 due to an after image of the light beam 211 that has been irradiated on the surface of the object 10.

Figure 3:
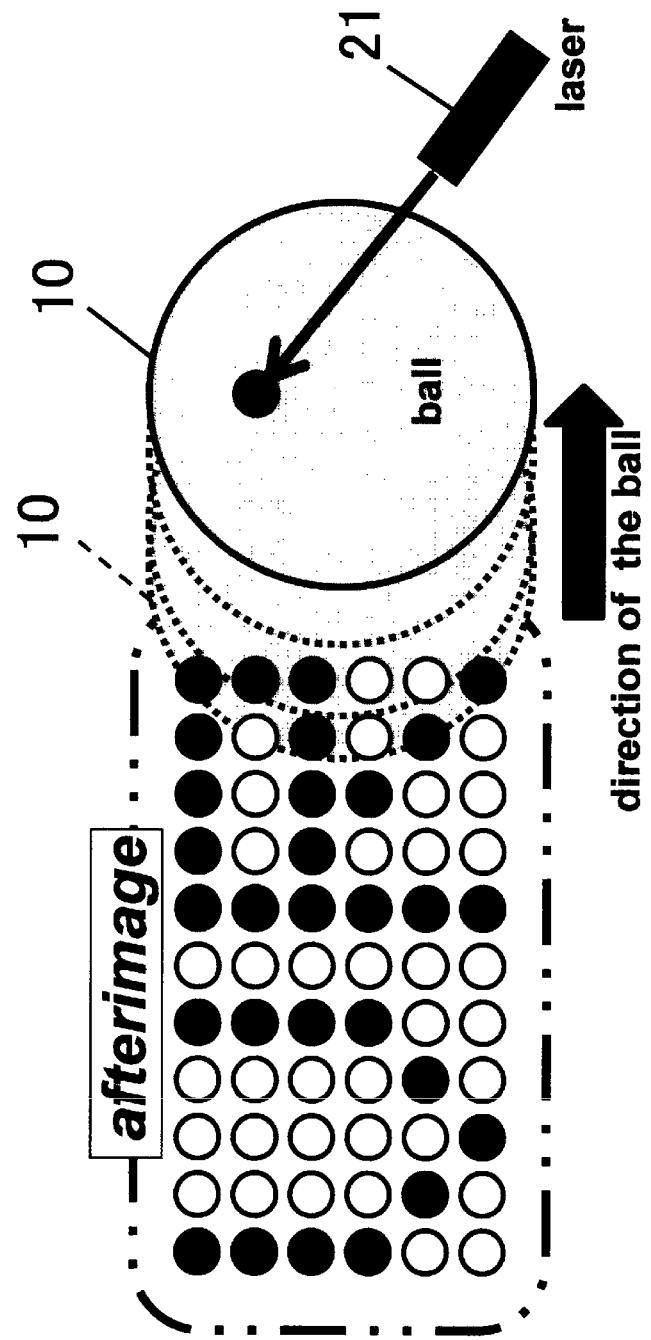
FIG. 3 is an explanatory drawing for showing a display example using the device of FIG. 1.

In FIG. 3, positions of the object 10 at previous times are shown by dotted lines. Also, white circles within the two-dot chain line in FIG. 3 simply virtually represent positions where the light beam 211 is not irradiated (namely, positions where irradiation is possible).

Figure 4:
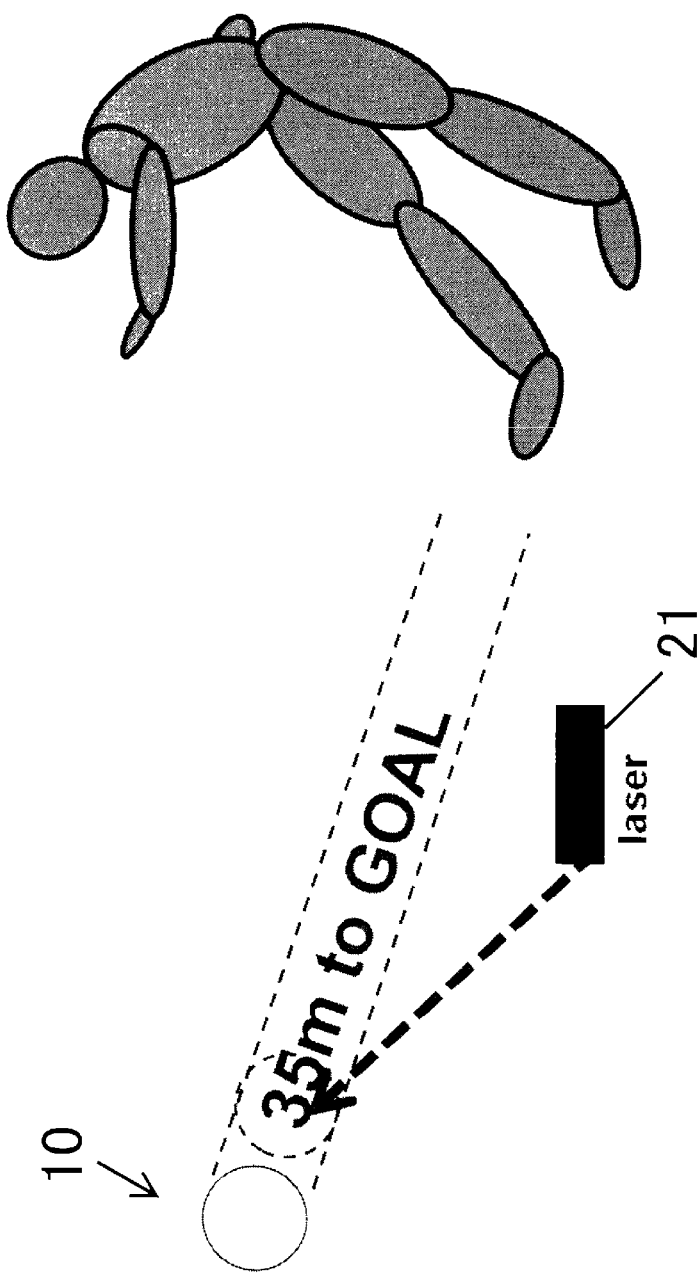
FIG. 4 is an explanatory drawing for showing a display example using the device of FIG. 1.

FIG. 4 shows an example where display of "35 m to GOAL" is displayed in an arbitrary space by irradiating a light beam onto the surface of a kicked soccer ball that is moving on an unknown trajectory, using the method of this example described above. In this way, according to this embodiment, there is the advantage that presentation of extremely innovative display that is different to existing displays in an arbitrary space becomes possible.

Here, with this embodiment, depending on the movement speed of the object 10, the scanning section 22 preferably carries out scanning such that the presentation of necessary information is completed in a range of viewing angle of 0° to 3°, or more preferably 0° to 2.5°, with viewpoint of an observer as a center. Movement speed of the object 10 can be acquired in the processing section 12 based on a relationship between a plurality of images that have been acquired by the previously described image sensor 11. Therefore, if an approximate positional relationship between the observer and the object is known (for example, in a case where the object is being viewed from far away), it is possible to carryout control of the light source 21 and the scanning section 22 by the processing section 12 such that rendering is completed within the range of viewing angle. In this way, with this embodiment, it is possible to improve the likelihood of an observer seeing a display.

The content of the present invention is not limited to each of the described embodiments. Various modifications are possible to the specific structure of the present invention, within the scope described in the patent claims.

For example, each of the above-described structural elements can exist as a functional block, and does not need to exist as independent hardware. Also, as a method of implementation, it is possible to use hardware or to use computer software. Further, a single functional element of the present invention may be realized as a set of a plurality of functional elements, and a plurality of functional elements of the present invention may be implemented by a single functional element.

Also, functional elements may be located at positions that are physically separated from one another. In this case, associated functional elements may be connected by means of a network. Functions may be realized by means of grid computing or cloud computing, and alternatively functional elements may also be constituted.

If a light source that can independently emit at least two colors from among the red, green, and blue, is used as the light source 21, it becomes possible to carry out color display on the surface of the object 10. Full-color display is also made possible if a light source capable of emitting all three of red, green, and blue is used.

The invention claimed is:

1. An information presentation device, comprising:
an object tracking section; and
a rendering section, wherein:
the object tracking section is controlled on the basis of information from an image sensor that acquires an image of an object on which a line of sight of the image sensor is trained,
the object tracking section is configured to control a line of sight direction so that the line of sight from the image sensor is directed towards the object in motion,
the rendering section is configured to irradiate a light beam to a surface of the object having a surface area by emitting the light beam in a direction that is substantially co-axial with the line of sight direction, and
information that has been rendered in a range that is larger than the surface area of the object is presented using an after image of the light beam that has been irradiated to the surface of the object,
wherein the rendering section comprises a light source and a scanning section, wherein:
the light source is configured to emit the light beam, and
the scanning section is configured to carry out a scanning to change an irradiation position of the light beam onto the object by changing the direction of the light beam with the line of sight direction,
wherein the light source is a laser light source, and
wherein the information presentation device further comprises a half mirror, wherein:
the half mirror is disposed at a point along the line of sight from the image sensor to the object, and
the light beam is conveyed in a direction that is substantially coaxial with the line of sight by the half mirror, and
wherein:
the scanning section is disposed between the half mirror and the laser light source,
an irradiated spot by the laser light on the object is set so as to be smaller than the surface area of the object, and
a display on the object is performed by unicursal movement of the irradiated spot of the laser light caused by the scanning section.

2. The information presentation device of claim 1, wherein the object tracking section further comprises a processing section and a line of sight direction control section, wherein:
the processing section is configured to acquire a position of the object based on the image of the object, and
the line of sight direction control section is configured to control the line of sight direction from the image sensor to the object so that the line of sight is directed towards the position of the object.

3. The information presentation device of claim 1, wherein the scanning section is configured to carry out the scanning so that presentation of required information is completed in a range of viewing angle of 0° to 3° with a viewpoint of an observer on the object as center, in accordance with a movement speed of the object.

4. The information presentation device of claim 1, wherein the light source is configured to independently emit light of at least two colors among red, green, and blue light.

5. An information presentation method comprising:
(a) a step of controlling a line of sight direction so that a line of sight of an image sensor is directed towards a moving object on the basis of information from the image sensor;
(b) a step of irradiating a light beam onto a surface of the object having a surface area by emitting the light beam in a direction that is substantially co-axial with the line of sight direction, wherein the light beam is emitted from a laser light source, and wherein the step of irradiating the light beam further includes scanning to change an irradiation position of the light beam onto the object by changing the direction of the light beam with the line of sight direction, and
(c) a step of presenting information that has been rendered in a range that is larger than the surface area of the object to an observer using an after image of the light beam that has been irradiated to the surface of the object, wherein the light beam is conveyed by a half mirror in a direction that is substantially coaxial with the line of sight, the half mirror being disposed at a point along the line of sight from the image sensor to the object,
wherein the scanning to change an irradiation position of the light beam is performed by a scanning section that is disposed between the half mirror and the laser light source,
wherein an irradiated spot of laser light on the object by the laser light source is set so as to be smaller than the surface area of the object, and
wherein a display on the object is performed by unicursal movement of the irradiated spot of the laser light caused by the scanning section.

* * * * *